July 14, 1936.    G. HAGLUND    2,047,627
PROCESS FOR PRODUCING SOLUTIONS OF ALKALI METAL SALTS OF SULPHUROUS ACID
Filed Jan. 12, 1933    3 Sheets-Sheet 1
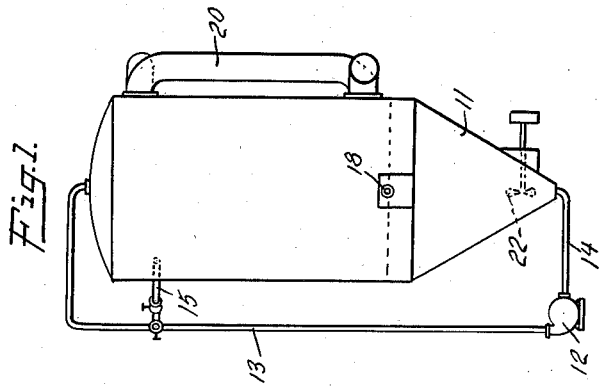
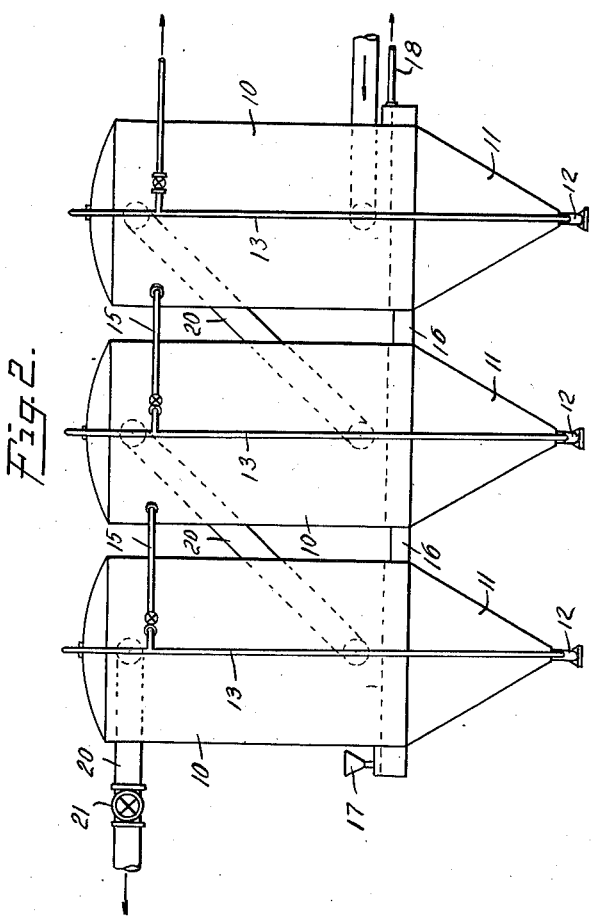
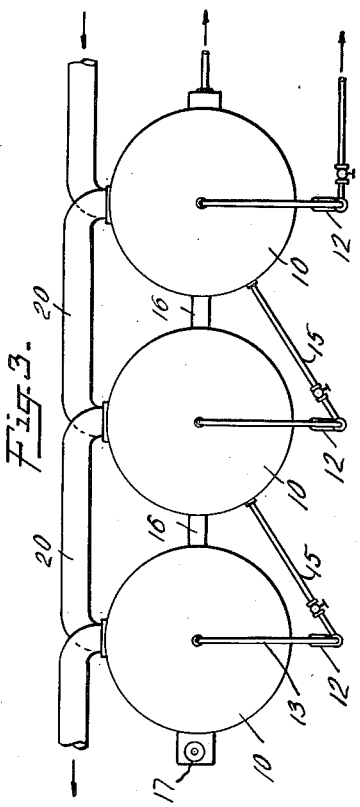
INVENTOR
Gustaf Haglund
BY
ATTORNEYS July 14, 1936.  G. HAGLUND  2,047,627
PROCESS FOR PRODUCING SOLUTIONS OF ALKALI METAL SALTS OF SULPHUROUS ACID
Filed Jan. 12, 1933   3 Sheets-Sheet 2
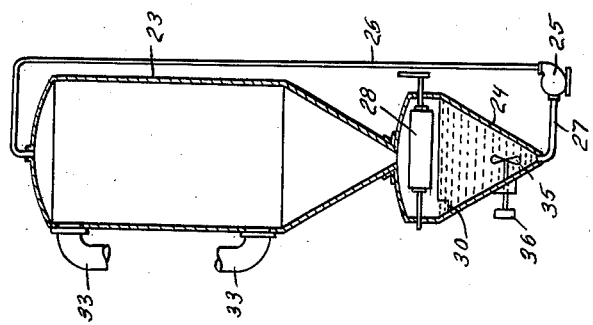
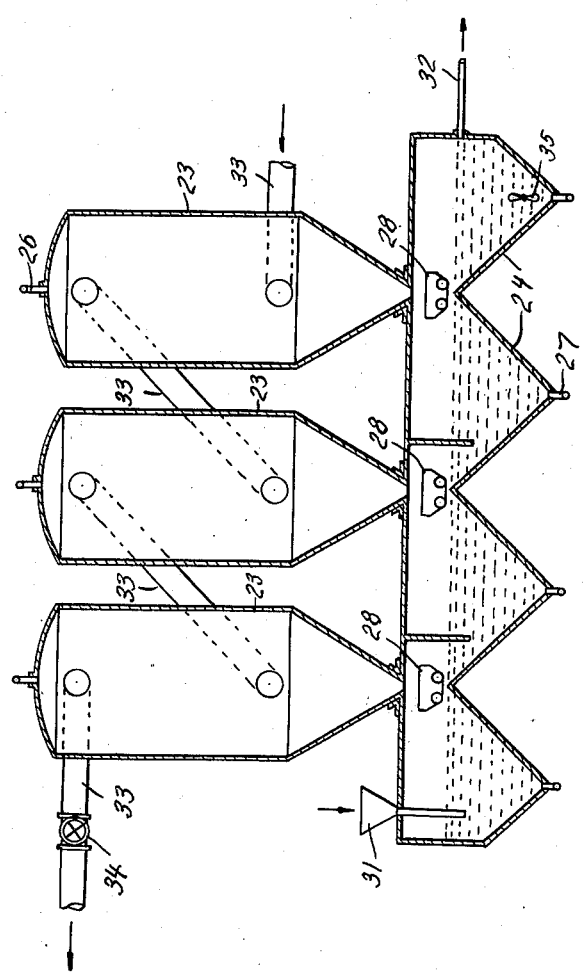
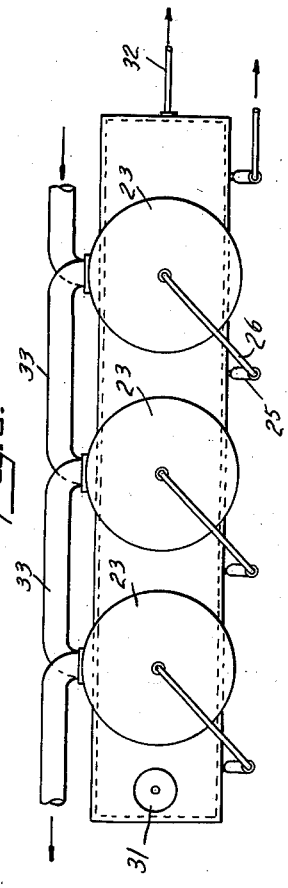
INVENTOR
Gustaf Haglund
BY
Pennie, Davis, Marvin & Edmonds
ATTORNEYS July 14, 1936.  G. HAGLUND  2,047,627
PROCESS FOR PRODUCING SOLUTIONS OF ALKALI METAL SALTS OF SULPHUROUS ACID
Filed Jan. 12, 1933  3 Sheets-Sheet 3

INVENTOR
Gustaf Haglund
BY
Pennie, Davis, Marvin & Edmonds
ATTORNEYS

Patented July 14, 1936

2,047,627

UNITED STATES PATENT OFFICE

2,047,627

PROCESS FOR PRODUCING SOLUTIONS OF ALKALI METAL SALTS OF SULPHUROUS ACID

Gustaf Haglund, Stockholm, Sweden, assignor to Patentaktiebolaget Gröndal-Ramen, Stockholm, Sweden Application January 12, 1933, Serial No. 651,244
In Sweden March 12, 1932

7 Claims. (Cl. 23—130)

This invention relates to the production of solutions of salts or sulphurous acid and has for an object the provision of an improved method for producing such solutions. More particularly, the invention contemplates the provision of an improved method for producing bisulphite solutions.

In the production of sulphite cellulose cooking liquor, sulphur dioxide gas is usually passed through towers filled with lime in lumps which is simultaneously sprinkled with water. The sulphur dioxide and water react with the lime to form bisulphite of calcium and carbon dioxide.

The above described process has some objectionable features. Thus, the concentration of the solution of bisulphite produced varies with the seasons of the year and the temperatures prevailing, due to the fact that sulphur dioxide and water react with lime more readily at higher temperatures. In winter time, or when the weather is cold, the solution of bisulphite obtained has a lower concentration than in the summer or generally during warm weather.

Furthermore, such a process requires apparatus of very large dimensions and does not allow of a perfect utilization of the lime, as the pieces of lime, after having been reduced through dissolution below a certain size of grain, hinder the flow of gas and consequently must be removed from the tower, which in itself is objectionable because of the time and labor required.

In order to avoid the aforementioned objectionable features, it has been proposed to produce solutions of bisulphite of calcium by letting sulphur dioxide react on finely divided limestone or quick-lime in water suspension. The process however has not given favorable results, and has consequently not been adopted in practice.

The same thing applies to the production of solutions of alkali bisulphite from solutions of salts of alkali metals, such, for example, as the sulphates of alkali metals and mixtures of sulphates of alkali metals and other salts of alkali metals by means of reactions with sulphur dioxide and finely divided carbonate of calcium or quick lime according to known processes.

The present invention has reference to a process for the continuous production of solutions of bisulphite, such, for example, as solutions of bisulphite of calcium or of an alkali metal, by combining sulphur dioxide and lime suspended in water or in suitable salt solutions (here as in the following, lime stands for lime stone as well as for quick lime). By this process, the objectionable features referred to above are avoided and considerable advantage is obtained in comparison to the use of lime in lumps.

According to the process of the invention, a current of sulphur dioxide gas is passed in contact with a countercurrent flow of a suspension of lime in water or in a suitable salt solution. The sulphur dioxide and lime suspension are preferably circulated through two or more absorption or reaction chambers or towers in series. The lime is sufficiently finely divided that it may be maintained readily in suspension during the course of the process, and the suspension comprising finely divided lime and liquid may be easily circulated by means of pumps. In the preferred process of the invention, lime and suspension liquor are introduced and the finished liquor is withdrawn at the same rate.

If the production of a solution of calcium bisulphite is aimed at, the lime is added suspended in water. The sulphur dioxide is then dissolved in the water and combines with the lime suspended therein to form bisulphite of calcium which is dissolved in the solution of sulphur dioxide formed.

If, on the other hand, a solution of sodium bisulphite is to be prepared, the lime is added suspended in a suitable solution of a sodium salt, e. g. sulphate of sodium. In this case also bisulphite of calcium is primarily formed which is then converted by the sodium sulphate into bisulphite of sodium and gypsum ($CaSO_4$).

A condition for carrying through the process according to the invention successfully is, as has been stated above, that the lime be used in such a finely divided state that it can be suspended without difficulty in the liquor employed, be kept in suspension by means of pumping and be transported and distributed in this form within the apparatus. As a natural consequence, insoluble substances that may be present in the lime, which are not affected by the reactions and also insoluble products, such as gypsum ($CaSO_4$) which may be formed during the reactions, are present in such a finely divided form that they remain suspended in the liquor and can be transported and distributed in the apparatus.

The degree of fineness of the lime is determined in such cases, when a reaction resulting in the formation of gypsum occurs, not only by the possibility of keeping the lime in suspension, but also by another factor, namely, by the degree in which one expects to utilize the lime. In these cases a coating of gypsum is deposited on the grains of lime and renders the dissolution and further reaction of the grains more difficult or prevents it altogether.

If the grains of lime are sufficiently small, the coating of gypsum on them will not be too thick to allow the surrounding liquor to penetrate the gypsum coating and to react with the lime. If, on the other hand, the grains of lime are too big, the coating of gypsum will be thicker and a complete conversion of the lime can not be effected.

The upper limit of the size of grain, when such a reaction can take place, lies at a diameter of the lime particles of about 0.14–0.15 mm. If a complete utilization of the added lime is proposed, the size of grain consequently should not exceed this limit. If, however, this matter is not considered essential, the size of grain is only determined by the possibility of keeping the lime in suspension in the manner stated above.

According to the process of the invention, favorable absorption or reaction conditions are obtained—(1) by circulating the lime suspension through each separate reaction chamber as many times and at such a velocity as may be required by the special conditions prevailing within the chamber; and (2) by regulating or adjusting the supply of suspension from one chamber to another. The circulation of the suspension or the liquor through any chamber can, if necessary or desirable, take place at a velocity many times greater than through any other chamber, and, also, the quantities of liquor that are brought in circulation through the various chambers can differ between themselves and vary according to the requirements. The lime suspension or lime and suspension liquor that is continuously supplied to the apparatus can be distributed and kept in circulation in the manner described in varying quantities in the separate chambers, without influencing the continuous flow of finished solution of bisulphite from the apparatus, whereby a continuous working is ensured.

The sulphur dioxide may be caused to flow through the reaction chambers by any suitable means. Thus, a fan may be provided for creating suction to draw the gas through the chambers, or the gas may be introduced into the chambers under pressure. The latter procedure is preferred because it is possible thereby to increase the absorption velocity for sulphur dioxide and thus increase the reaction velocity. The sulphur dioxide gas is passed through the apparatus according to the counter-current principle, as has already been explained, and the gas when entering the apparatus, consequently, first comes into contact with bisulphite solution which is in a practically finished state, and which contains only very small quantities of unconverted lime and then passes through the other reaction chambers meeting the lime suspension which contains ever increasing quantities of lime.

The accompanying drawings illustrate apparatus which may be employed in carrying out the process of the invention.

In the drawings, Fig. 1 is an end elevation of a form of apparatus comprising three cylindrical containers or towers arranged at the same elevation and each provided with a separate conical collecting chamber for the liquor;

Fig. 2 is a side elevation of the apparatus illustrated in Fig. 1;

Fig. 3 is a plan view of the apparatus shown in Fig. 2;

Figure 7:
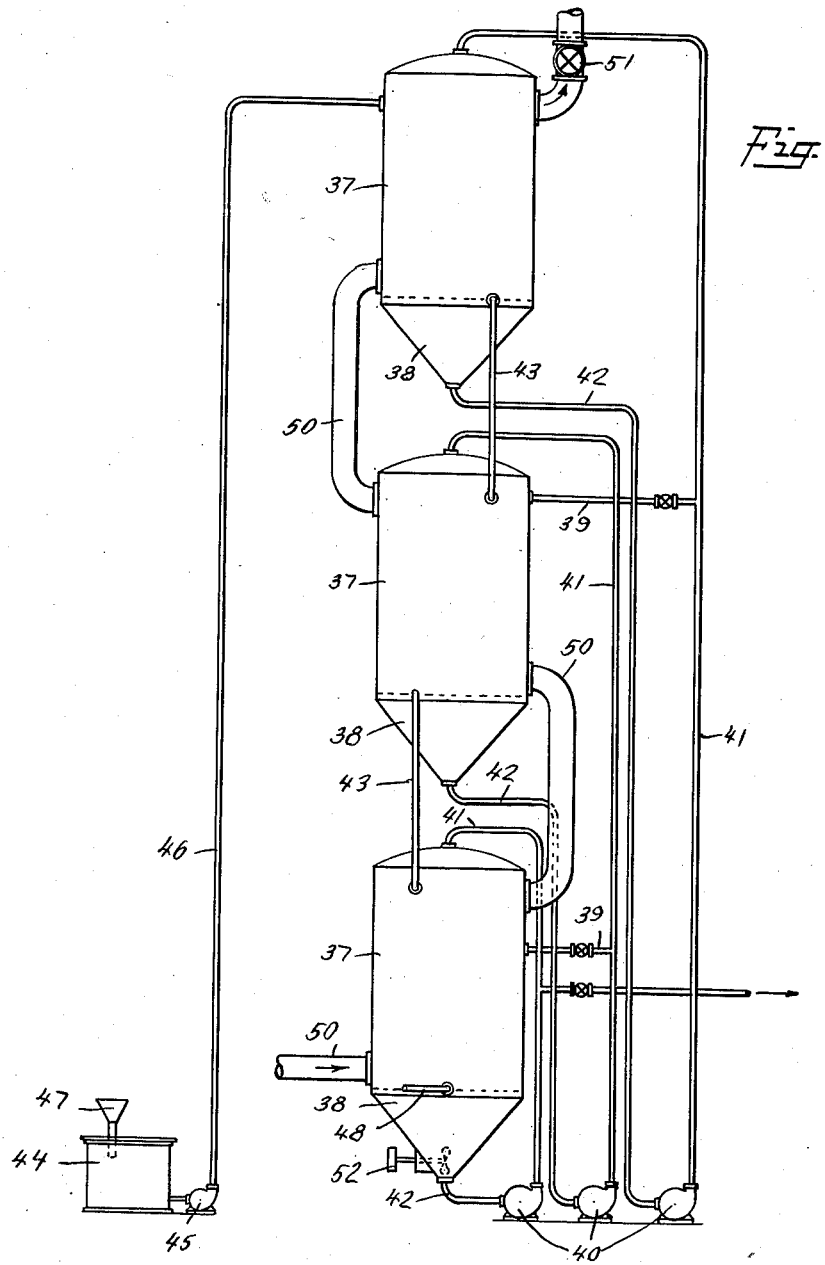

Figs. 4 to 6 are end and side elevations and a plan, respectively, of apparatus similar to the apparatus illustrated in Figs. 1 to 3, but in which interconnected collecting chambers for the liquor are disposed below the containers or towers; and Fig. 7 is an elevation of apparatus similar to that shown in Figs. 1 to 3, but in which the cylindrical containers or towers are arranged at different elevations.

The apparatus illustrated in Figs. 1 to 3 comprises three similar units each comprising a cylindrical tower or container. The upper part 10 of each tower or container is arranged as an absorption reaction chamber which can be conveniently filled with rings, coke or pumice lumps or any other suitable packing material for obtaining a large surface in order to facilitate the reactions between the added materials, and the lower part 11 of which, being conically shaped, is a collecting chamber for the suspension or the liquor with suspended solid substances.

Each unit is provided with a circulating system comprising a pump 12 and pipes 13 and 14 connecting the upper portion of the reaction chamber and the lower portion of the collecting chamber with the pump.

For transporting the suspension from one container to another, branch pipes 15 provided with suitable valves are arranged which connect the pipes 13 and the upper part of the reaction chamber 10 of the adjacent container.

The collecting chambers are connected by means of conduits 16 to permit the flow of liquor from one collecting chamber to another so that the level of liquor in all collecting chambers will be equally high, independent of the special circulation conditions prevailing in the separate collecting chambers and the reaction chambers.

For the supply of liquor and lime, funnel-shaped pipes 17 or the like are provided, and pipes 18 are provided for the flowing off of the finished cooking liquor. The sulphur dioxide is supplied through a large pipe or conduit 20 which communicates with the lower portion of the reaction chamber of the last container of the battery (where the lime suspension leaves the battery), and from the upper part of this chamber passes to the lower part of the reaction chamber of the container next before, and in this way proceeds through the battery. In the pipe 20 from the first container of the battery a valve 21 is arranged for regulating the gas pressure, in case the SO2 gas is added under pressure.

Under certain conditions it may be desirable to have an extra stirring arrangement, for instance a propeller or the like, in the lower part of the collecting chambers, which can serve as an auxiliary medium in addition to the pump, for keeping the solid substances in suspension. Such an arrangement may be particularly desirable in the last container of the battery from which the finished solution of bisulphite is drawn. For this reason, a stirring device 22 is arranged in the last collecting chamber of the battery. Stirring devices may also be arranged in the other collecting chambers.

The apparatus illustrated in Figs. 4 to 6 also comprises a battery of three similar units each comprising a cylindrical container or reaction chamber 23 which may be filled with suitable packing material as in the case of the apparatus illustrated in Figs. 1 to 3. Collecting chambers 24 are disposed directly below and in direct communication with the reaction chambers. Each unit is provided with a circulating system comprising a pump 25 and pipes 26 and 27 connecting an upper portion of a reaction chamber and a lower portion of a collecting chamber with the pump. The collecting chambers are provided with distributing devices 28 for supplying the suspension from one collecting chamber to another.

The collecting chambers are connected by means of conduits 30 to permit the flow of liquor from one collecting chamber to another so that the liquor level will be the same in all chambers. A funnel-shaped pipe 31 is provided for introducing liquor and lime, and a discharge pipe 32 is provided for withdrawing the finished cooking liquor. The sulphur dioxide gas is supplied through a large pipe or conduit 33 arranged to conduct the gas through all of the reaction chambers in series, the gas entering each chamber at the bottom and leaving at the top. A valve 34 is provided for regulating the gas pressure. The last collecting chamber 24 of the series is provided with a stirring device comprising a suitable shaft having a propeller 35 and a pulley 36 mounted thereon. The pulley may be connected with a suitable source of power (not shown).

The apparatus shown in Fig. 7 comprises a battery of three similar units, each including a cylindrical tower or container similar to the towers of the apparatus illustrated in Figs. 1 to 3. The cylindrical towers of the different units are mounted at different elevations, one above another. The upper part 37 of each tower is filled with suitable packing material, and the lower conical part 38 forms a collecting chamber for the liquor.

Each unit is provided with a circulating system comprising a pump 40 and pipes 41 and 42 connecting the upper portion of the reaction chamber and the lower portion of the collecting chamber with the pump. Branch pipes 39 connecting the pipes 41 with the upper part of the reaction chamber of the adjacent container and having suitable valves therein are provided for conducting the suspension from one container to another. Overflow pipes 43 are provided for conducting liquor from the uppermost and intermediate collecting chambers to the upper portions of the intermediate and lowermost reaction chambers to maintain the liquor in the different collecting chambers at the same levels.

The lime suspension is introduced into the system from a supply tank 44 by means of a pump 45 and a conduit 46 connected with the upper portion of the uppermost reaction chamber. A funnel-shaped conduit 47 is provided for introducing the suspension into the supply tank. A pipe 48 connected with the upper portion of the lowermost collecting chamber is provided for withdrawing finished cooking liquor.

The sulphur dioxide gas is supplied through large conduits 50 arranged to conduct the gas through all of the reaction chambers in series, the gas entering each chamber at the bottom and leaving at the top. A valve 51 is provided for regulating the gas pressure.

The last collecting chamber in the series is provided with a stirring device 52 similar to that provided in the apparatus illustrated in Figs. 1 to 6.

A process of the invention may be carried out in apparatus of the type illustrated in Figs. 1 to 3 in the following manner. Through the funnel 17, water or liquor from which the bisulphite solution is to be formed, and also a quantity of finely crushed lime or quick lime, proportional to the desired composition of the bisulphite solution, is added so that the water or the solution with the suspended lime will fill the first collecting chamber 11. From the collecting chamber the suspension is forced through the pipes 13 and 14 by means of the pump 12 to the upper part of the first absorption or reaction chamber 10 and then flows downwardly through this chamber which, as hereinbefore pointed out, is preferably filled with filling material of some kind, and then returns to collection chamber 11. During the course of its downward passage through the reaction chamber, the suspension meets the ascending $SO_2$-gas, introduced through the pipe 20, which is absorbed in the liquor and reacts with the substances dissolved or suspended in the liquor.

While passing upwardly through the piping 13, part of the suspension is directed through the branch pipe 15 to the second container of the battery. The suspension entering the second container is circulated by means of the pump and piping associated therewith, and, during the course of such circulation, a portion of the suspension passes through the second branch pipe 15 to the last container of the battery, from which the finished bisulphite solution is continuously withdrawn through the outlet 18 along with lime that may not have been consumed, or with suspended insoluble substances formed, which afterward settle in a settling tank outside the apparatus (not shown).

The quantity of suspension passing from one container to another is determined by the special conditions in each container. In the container into which the suspension is first introduced it is exposed to the influence of a $SO_2$ gas with a comparatively small concentration of $SO_2$. The remaining sulphur dioxide is therefore comparatively easily absorbed in the added suspension, and, consequently, the suspension from this container is comparatively rapidly directed to the next container and brought in contact here with a stronger sulphur dioxide gas. Suitable valves are provided in the branch pipes 15, as indicated, to control the flow of the suspension therethrough.

On account of the communicating connections between the collecting chambers (conduits 16) such a flow of suspension from one container to another does not cause any rise of the level of liquor in the collecting chamber of the last named container—the level of the liquor being kept at the same height in all the containers. In order to prevent the gas from passing through the connection conduits 16, those conduits are provided with traps (not shown).

As all the collecting chambers communicate with one another, the quantity of liquor which is continuously flowing from the last container of the battery will naturally be equal to the quantity which is being added at the inlet end of the apparatus, also in a continuous manner, hence it is evident that the circulation velocity of the separate containers has no influence on the quantity of liquor flowing from the apparatus.

The operation of apparatus of the type illustrated in Figs. 4 to 7 will be clear from a consideration of the operation of apparatus of the type illustrated in Figs. 1 to 3.

In the operation of apparatus of the type illustrated in Fig. 7, a suspension of lime in water or a salt solution is introduced by means of the pump 45 and the piping associated therewith from the supply tank 44 into the upper portion of the uppermost reaction chamber 37. When the liquor in the uppermost collecting chamber 38 has reached a certain level, the suspension flows through the uppermost pipe 43 to the reaction chamber of the container lying immediately below, and, in the same way, from the collecting chamber of this container to the lowermost container. In other respects, the operation of the apparatus is the same as the operation of the apparatus illustrated in Figs. 1 to 6.

The chemical reactions of the process have already been explained. When using a suspension of lime in water, a solution containing bisulphite of calcium and absorbed $SO_2$ is obtained, in which solution the content of bisulphite of calcium can, if desired, be kept constant.

When employing a suspension of lime in a solution of a sulphate of an alkali metal, there is obtained, as has been said above concerning sodium sulphate, at first a bisulphite of calcium which then reacts with the sulphate of the alkali metal forming bisulphite of the alkali metal and gypsum. When the alkali metal sulphate solutions also contain alkali metal carbonates, as may be the case when solutions obtained by leaching of molten masses obtained from the regeneration of waste cellulose liquors, the carbonates as well as the sulphates are converted to bisulphites. In both cases, it is possible to obtain solutions of bisulphite containing fixed concentrations of the salts in the finished solution.

When solutions of sulphate of an alkali metal are used, the lime should be most finely divided if a rapid and complete reaction is to ensue. The formed solutions of the bisulphite of the alkali metal in this case also contain calcium bisulphite and gypsum in solution. The solubilities of these calcium salts in such solutions are different than in ordinary water solutions of calcium bisulphite and absorbed $SO_2$, and they are reduced when the concentration of the bisulphite of the alkali metal in the solution increases. As it is desirable to obtain as small quantities of calcium salts as possible in the solution of bisulphites of an alkali metal, the concentration of bisulphite of the alkali metal in the solution according to the invention is preferably kept so high that it corresponds to or exceeds 40 gr. $Na_2O$ per litre. The quantities of gypsum precipitated are, as a consequence, considerable, but it does not present any difficulties to run the apparatus under these conditions.

By the above described process the preparation of solutions of bisulphite can consequently be effected in a much easier and cheaper way than heretofore, and, furthermore, the apparatus described above will occupy only a small part of the space required for an apparatus of corresponding capacity treating lime in lumps.

The process according to the invention may also include the production of solutions of magnesium bisulphite or solutions containing magnesium bisulphite, in case dolomite instead of lime is employed.

It should further be pointed out that in the design of the apparatus described and the combination of the various parts, such alterations or modifications may be undertaken as do not influence the fundamental principle of the apparatus and which are in agreement with the scope of the invention.

I claim:

1. The process for preparing solutions of salts of sulphurous acid which comprises passing sulphur dioxide gas and a suspension of a calcium compound in a suitable liquid through a series of absorption or reaction chambers in countercurrent relationship, and circulating the suspension in at least some of the chambers of the series during the course of its passage through the series of chambers, so that the circulating suspension passes in countercurrent contact with the gases flowing through the chambers, the extent of circulation of the suspension in at least one of the chambers in which circulation is taking place being different from the extent of circulation in at least one other chamber in which circulation is taking place, and independent of the rate of flow of the suspension through the chambers in series.

2. The process for preparing solutions of salts of sulphurous acid which comprises continuously passing sulphur dioxide gas and a suspension of a calcium compound in a suitable liquid through a series of absorption or reaction chambers in countercurrent relationship, circulating the suspension in at least some of the chambers of the series during the course of its passage through the series of chambers, so that the circulating suspension passes in countercurrent contact with the gases flowing through the chambers, the extent of circulation of the suspension in at least one of the chambers in which circulation is taking place being different from the extent of circulation in at least one other chamber in which circulation is taking place, and independent of the rate of flow of the suspension through the chambers in series, and continuously withdrawing solution from the last chamber of the series.

3. A process according to claim 1, characterized in that a quantity of suspension proportional to the desired composition of solution to be produced is led into the first reaction chamber, and that a corresponding quantity of finished solution of the fixed composition per unit of calcium compound is removed from the last reaction chamber.

4. A process according to claim 1, characterized in that the suspension is circulated with varying degrees of velocity through the separate reaction chambers in which circulation is taking place, and a number of times according to the concentration of the sulphur dioxide, the quantity of unconsumed calcium compound and the volume of liquor remaining unsaturated.

5. A process according to claim 6, characterized in that the extent of circulation of the suspension in at least one of the chambers in which circulation takes place is different from the extent of circulation in at least one other chamber in which circulation takes place, and independent of the rate of flow of the suspension through the chambers in series.

6. In a process for preparing solutions of salts of sulphurous acid in which sulphur dioxide and a suspension of finely divided lime are permitted to react while passing countercurrently through a series of absorption or reaction chambers and in which the suspension of lime is caused to circulate through one or more of the absorption or reaction chambers while flowing through the chambers in series, the improvement which comprises causing suspension to pass into a collecting chamber disposed adjacent the lower portion of each absorption or reaction chamber, wherein the suspension partially settles to produce a suspension of relatively high density in the lower portion of the collecting chamber and to produce a suspension of relatively low density in the upper portion of the collecting chamber, withdrawing suspension of relatively high density from the collecting chamber and introducing it in part into the absorption or reaction chamber from which it has passed and in part into the absorption or reaction chamber next in the series, and providing for the passage of suspension of relatively low density between adjacent collecting chambers.

7. In a process for preparing solutions of salts of sulphurous acid in which sulphur dioxide and a suspension of finely divided lime whose particle diameter does not substantially exceed 0.14–0.15 mm. are permitted to react while passing countercurrently through a series of absorption or reaction chambers and in which the suspension of lime is caused to circulate through one or more of the absorption or reaction chambers while flowing through the chambers in series, the improvement which comprises causing suspension to pass into a collecting chamber disposed adjacent the lower portion of each absorption or reaction chamber, wherein the suspension partially settles to produce a suspension of relatively high density in the lower portion of the collecting chamber and to produce a suspension of relatively low density in the upper portion of the collecting chamber, withdrawing suspension of relatively high density from the collecting chamber and introducing it in part into the absorption or reaction chamber from which it has passed and in part into the absorption or reaction chamber next in the series, and providing for the passage of suspension of relatively low density between adjacent collecting chambers.

GUSTAF HAGLUND.